(12) United States Patent
Langford

(10) Patent No.: US 8,496,985 B2
(45) Date of Patent: Jul. 30, 2013

(54) PUFFED PET TREAT

(75) Inventor: Christopher J. Langford, Chehalis, WA (US)

(73) Assignee: Trident Seafood Corporation, Seattle, WA (US)

( * ) Notice: Subject to any disclaimer, the term of this patent is extended or adjusted under 35 U.S.C. 154(b) by 213 days.

(21) Appl. No.: 12/557,237

(22) Filed: Sep. 10, 2009

(65) Prior Publication Data

US 2010/0062111 A1 Mar. 11, 2010

Related U.S. Application Data

(60) Provisional application No. 61/095,895, filed on Sep. 10, 2008.

(51) Int. Cl.
*A21D 13/00* (2006.01)
*A23L 1/30* (2006.01)
*A23L 1/18* (2006.01)

(52) U.S. Cl.
USPC .............. 426/559; 426/72; 426/446; 426/448

(58) Field of Classification Search
USPC .................... 426/242, 442, 446, 448, 559
See application file for complete search history.

(56) References Cited

U.S. PATENT DOCUMENTS

| | | | |
|---|---|---|---|
| 3,904,769 A * | 9/1975 | Sair et al. ................ | 426/104 |
| 3,958,032 A | 5/1976 | Merriam | |
| 4,125,630 A * | 11/1978 | Orthoefer .............. | 426/104 |
| 4,216,240 A * | 8/1980 | Shirai et al. ............ | 426/516 |
| 4,245,552 A | 1/1981 | Small et al. | |
| 4,738,861 A | 4/1988 | Blain et al. | |
| 4,743,460 A | 5/1988 | Gellman et al. | |
| 5,030,468 A | 7/1991 | Van Lengerich et al. | |
| 5,149,555 A | 9/1992 | Flindall | |
| 6,180,151 B1 * | 1/2001 | Geng et al. ............. | 426/448 |
| 6,479,090 B1 | 11/2002 | Carey et al. | |
| 6,491,959 B1 | 12/2002 | Chiang et al. | |
| 6,511,691 B1 * | 1/2003 | Willoughby et al. ...... | 426/512 |
| 7,879,384 B2 | 2/2011 | Klemann et al. | |
| 2006/0057269 A1 * | 3/2006 | Tiefenbacher ............ | 426/549 |
| 2009/0087536 A1 | 4/2009 | Fannon | |
| 2010/0119658 A1 | 5/2010 | Levin | |
| 2011/0014343 A1 | 1/2011 | Jordan | |

* cited by examiner

*Primary Examiner* — Humera Sheikh
*Assistant Examiner* — Bhaskar Mukhopadhyay
(74) *Attorney, Agent, or Firm* — Stoel Rives LLP

(57) ABSTRACT

An animal protein-based dog treat has a soft crunch and a stable shelf life without use of an appreciable amount of sodium or chemical preservatives. A method of producing the dog treat entails use of extrusion and heating processes to trap moisture in the interior of the dog treat, and then to expand and evaporate the moisture. This process creates in an internal portion of the dog treat voids or air pockets that provide desired texture and strength characteristics.

24 Claims, 4 Drawing Sheets

PUFFED PET TREAT

RELATED APPLICATION

This application claims benefit under 35 U.S.C. §119(e) of U.S. Provisional Application No. 61/095,895, titled "Crunchy Protein Dog Treat," filed Sep. 10, 2008.

TECHNICAL FIELD

This disclosure relates generally to pet treats and more particularly to protein-based dog treats.

BACKGROUND INFORMATION

Known dog treats produced from animal protein (e.g., muscle) have a number of shortcomings. For example, due to stability standards based upon water activity, known dog treats produced from animal protein are typically preserved with salt or other chemicals. Dog treats preserved with salt and/or chemicals are relatively unhealthy; and consumer acceptance of these dog treats is relatively low compared to all natural, low salt shelf stable snacks made from animal protein. However, low salt, protein-based dog treats are typically very hard and require application of a considerable bite force by a pet to crush and ingest the treat. Hard dog treats usually include a relatively high caloric content, thus rendering such treats inappropriate for use as a pet training aid because the caloric intake over the course of a training session may be too high and the treats may be too hard.

SUMMARY OF THE DISCLOSURE

One embodiment of the disclosed pet treat is made from a mixture including a base recipe of protein, starch, and water. The pet treat includes an interior portion having an air pocket structure developed from water vapor that forms and expands during a drying process. The air pocket structure provides the pet treat with a density and a compressive strength that are appreciably less than the density and compressive strength of a pet treat having no internal air pocket structure. The air pocket structure also provides a puffed form for the pet treat. The pet treat includes an outer surface that substantially encloses the interior portion and is substantially free from air pockets.

Additional aspects and advantages will be apparent from the following detailed description of preferred embodiments, which proceeds with reference to the accompanying drawings.

DETAILED DESCRIPTION OF PREFERRED EMBODIMENTS

Overview

Figure 1:
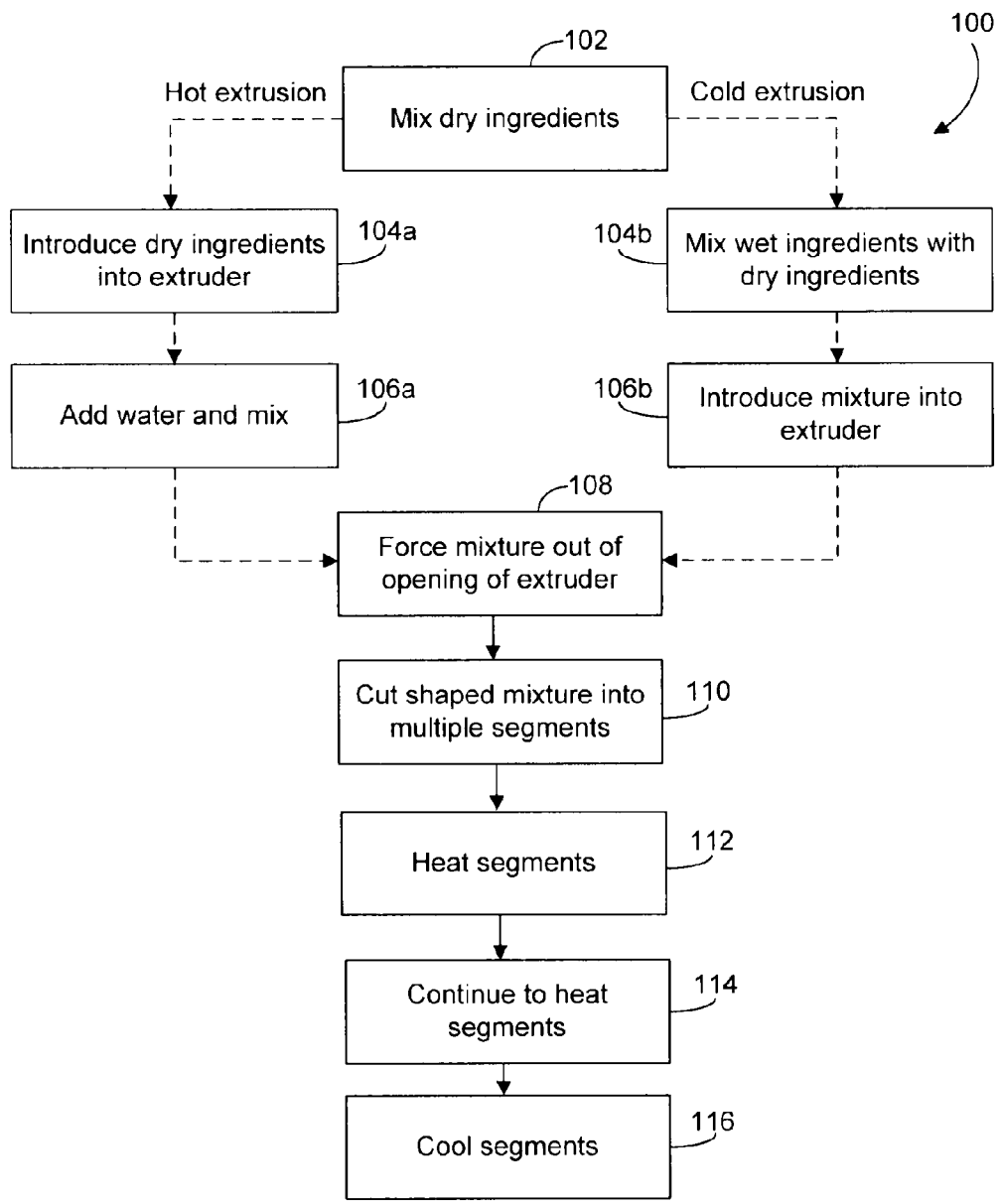
FIG. 1 is a flow chart of a process for producing a dog treat according to one embodiment.

With reference to the above-listed drawings, this section describes particular embodiments and their detailed construction and operation. The embodiments described herein are set forth by way of illustration only and not limitation. Skilled persons will recognize in light of the teachings herein that there is a range of equivalents to the example embodiments described herein. Most notably, other embodiments are possible, variations can be made to the embodiments described herein, and there may be equivalents to the components, parts, or steps that make up the described embodiments. For example, although the embodiments described below pertain to dog treats, the disclosed embodiments may be equally applicable to food items for other animals.

For the sake of clarity and conciseness, certain aspects of components or steps of certain embodiments are presented without undue detail where such detail would be apparent to skilled persons in light of the teachings herein and/or where such detail would obfuscate an understanding of more pertinent aspects of the embodiments.

According to one embodiment, a method of producing a puffed dog treat entails use of extrusion and heating processes to trap moisture in the interior of the dog treat, and then to expand and evaporate the moisture. This process creates in an interior portion of the dog treat voids or air pockets that provide desired texture and strength characteristics.

For example, puffed dog treats are made by providing an extrusion apparatus in which a mixture including protein, starch, and water is contained. The extrusion apparatus includes an opening from which the mixture is to be extruded, and the mixture is forced out of the opening to from a shaped extrudate. The shaped extrudate is cut into multiple segments, and each of them includes an interior portion and an outer surface substantially enclosing the interior portion. The outer surfaces, which are skin-like in that they have a tensile strength greater than the tensile strength of the interior portions, are formed as the mixture passes through the opening of the extrusion apparatus. Moreover, the outer surfaces are hardened as the segments are heated or dried as described in greater detail below. Also, air drying of the outer surfaces that occurs after the mixture is extruded but before the segments are heated contributes to toughening of the outer surfaces. The interior portions include moisture that is trapped due to the skin-like outer surfaces, making the segments small pressure vessels.

The segments are heated at a temperature that causes the outer surfaces to harden (e.g., case hardening) and the moisture of the interior portions to transform to vapor (e.g., steam). The outer surfaces act as moisture barriers so that an appreciable amount of the vapor is retained within the segments while the vapor expands to thereby form air pockets and air cavities in the interior portions and cause the segments to expand or "puff up." The expansion of the segments creates puffed dog treats that have a soft crunch.

Production Method

FIG. 1 is a flow chart depicting a method 100 of producing dog treats according to one embodiment. First, dry ingredients for the dog treats are mixed together (step 102). Any known mixing device may be used to mix the dry ingredients. The dry ingredients include dry protein and starch. The protein preferably is dry muscle protein from one or more types of animals. For example, fish, poultry, mammal meat, or a combination thereof may be used. The starch is preferably potato starch such as modified potato starch, unmodified potato starch, or a combination of modified and unmodified potato starch. The dry ingredients may also include one or more dry nutritional supplements and/or flavor enhancers (e.g., palatants). For example, dry nutritional supplements may include dried fruits, vitamins, amino acids, probiotics, prebiotics, and minerals. The dry ingredients are mixed and blended, preferably at room temperature, until a uniform blend is achieved. The consistency of the dry ingredients at this stage is similar to that of dry ingredients for bread, cookies, or cake.

FIG. 1 shows two alternative processes—a hot extrusion process and a cold extrusion process—that may be implemented in the method 100 after the dry ingredients are mixed. In the hot extrusion process, the dry ingredients are introduced into an extruder (step 104a). Wet ingredients such as water, liquid nutritional supplements (e.g., oils and liquid forms of fruits, vitamins, amino acids, probiotics, prebiotics, and minerals) may also be introduced into the extruder with the dry ingredients. The extruder may be any type of known hot extruder (e.g., single or twin screw extruder) used for making food items. For example, the extruder may be a Coperion 26 millimeter (mm) twin screw extruder available from Coperion Group, GmbH of Stuttgart, Germany, a hot extruder available from Clextral, Inc. of Tampa, Fla. a hot extruder available from Wenger Manufacturing, Inc. of Sabetha, Kans., or a hot extruder available from Bühler AG of Uzwil, Switzerland. After the dry ingredients (and liquid nutritional supplements, if any) are introduced into the extruder, water is added and the extruder folds, kneads, and mixes the dry ingredients and water to make a wet ingredient blend or mixture (step 106a). The folding and mixing action is achieved by high shear and heat zones of the hot extruder machine design. An amount of water is added so that the mixture has a moisture content ranging from about 20% by weight to about 50% by weight, preferably from about 32% by weight to about 40% by weight.

In the cold extrusion process, the wet ingredients (e.g., water and liquid nutritional supplements) are added to and mixed with the dry ingredients to form a mixture (step 104b) before the dry ingredients are introduced into an extruder. The mixture is then introduced into the extruder (step 106b). The extruder may be any type of known cold extruder used for making food items. For example, the cold extruder may be a single screw extruder or may include a positive displacement pump. For example, a cold extruder available from Coperion Group, GmbH; Clextral, Inc.; Wenger Manufacturing, Inc.; or Bühler AG may be used.

In the hot and cold extrusion processes, the mixture is forced out of an opening of the extruder to form a shaped extrudate (step 108). The extruder includes a die plate, nozzle, or tubing having stationary walls defining an opening from which the mixture is extruded. For example, the extruder forces (e.g., pumps) the mixture through a straight, smooth-walled die or tubing having an opening of predetermined dimensions. The opening of the die plate, nozzle, or tubing may be of any shape such as rectangular, circular, square, triangular, elliptical, or irregular shape. For example, the opening may be of generally rectangular shape with rounded corners and may include dimensions of about 0.63 centimeter (cm) by about 1.5 cm with a radius of about 0.32 cm at the corners. The side walls of the opening may be about 0.19 cm in length. As the mixture is forced out of the opening, the mixture is shaped according to the shape of the opening, and the mixture develops an outer surface that has characteristics different from those of an interior portion of the shaped mixture. For example, the outer surface of the shaped mixture has a tensile strength greater than that of the interior portion. In other words, a skin-like surface is formed on the outside of the mixture when the mixture is forced out of the opening. The outer surface forms as a result of compressing and burnishing the outer surface as the extrudate passes along the stationary walls of the die plate, nozzle, or tubing. The outer surface of the mixture is smoothed and compressed (e.g., burnished) as the mixture contacts the stationary walls when it is being forced out of the opening. Moreover, a contributing factor to denser and higher strength characteristics of the skin-like outer surface is a heating/drying process described below. As the mixture is extruded out of the opening, the mixture may tend to expand so that the shaped mixture has cross-sectional dimensions slightly greater than the dimensions of the opening. For example, the cross-sectional dimensions of the mixture after extrusion may be about 1 cm by about 1.9 cm. Expansion of the extrudate is caused by a number of different factors. For example, during extrusion, the moisture may become hot and start to turn to expanding water vapor. Moreover, hydration and heating of the starch in the mixture causes expansion. The extrusion process binds and holds the extrudate together. As the extrudate air dries before a drying process described below, the cross sectional dimensions of the extrudate may reduce to about 0.76 cm by about 1.65 cm. The compressive strength of the extrudate before the drying process is in a range from about 113 grams (g) to about 170 g.

Figure 2:
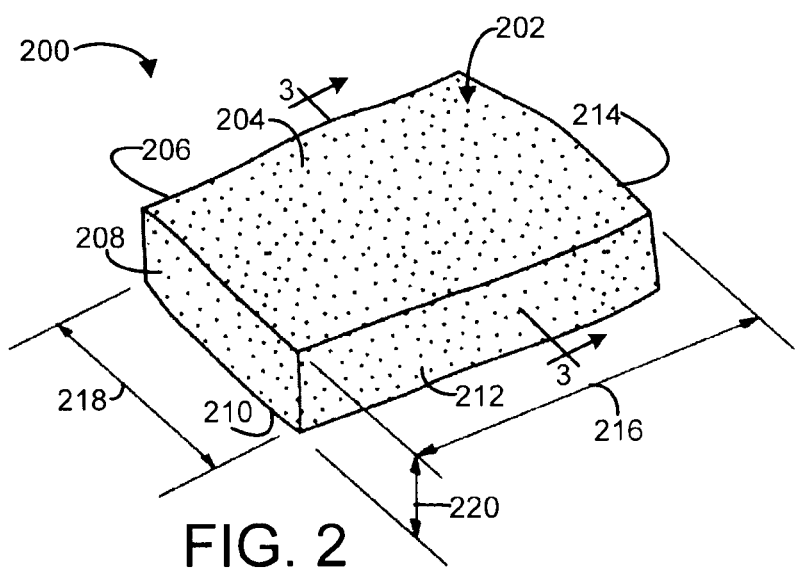
FIG. 2 is an isometric view of a segment of an extruded mixture, according to one embodiment, before the segment is baked to form a puffed dog treat.
Figure 3:
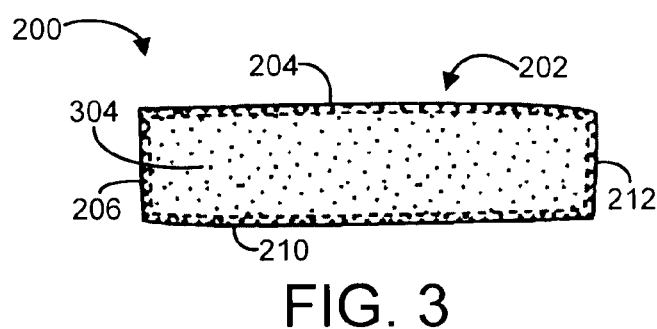
FIG. 3 is a sectional view taken along lines 3-3 of FIG. 2.

After the mixture is extruded from the opening, the mixture is cut by a cutting device (e.g., knife) into multiple segments (e.g., pellets), each segment corresponding to an individual dog treat (step 110). When the mixture is cut, an outer surface as described above also forms on the cut ends of the segments from cutting (e.g., shearing) action of the cutting device; the cutting device burnishes each end. Thus, the outer surface of the segments substantially encloses the interior portion. FIG. 2 is a three-dimensional view of an extruded segment 200 according to one example. Segment 200 is rectangular-shaped with rounded edges and includes an outer surface 202 on its six sides 204, 206, 208, 210, 212, and 214. FIG. 3 is a cross-sectional view of segment 200. FIG. 3 shows outer surface 202 surrounding an interior portion 304. Interior portion 304 includes moisture from the wet ingredients, and outer surface 202 substantially retains the moisture in interior portion 304. Nominal dimensions of segment 200 are a length 216 of about 2.54 cm, a width 218 of about 1.65 cm, and a height (i.e., thickness) 220 of about 0.76 cm (measured at approximately the center of segment 200).

After the mixture is cut into segments 200, they are dried according to a drying process. The drying process includes a first heating step 112 in which the segments are placed in a heating device (e.g., oven) and heated using infrared radiation, microwave radiation, radio frequency radiation, direct hot air, direct flame, steam, an electric heat source, or another type of heat source. Segments 200 are heated at a temperature that is approximately at or above the boiling point of water. For example, the temperature inside the oven may be approximately 148.9 degrees Celsius (° C.). First heating step 112 last approximately three to six minutes. First heating step 112 allows two things to happen—outer surface hardening, and segment expansion or "puffing." For example, as segments 200 heat up, their outer surfaces dry and harden and thereby increase in tensile strength, such that the moisture in interior portions 304 is substantially trapped and not allowed to escape from segments 200. Additionally, as segments 200 continue to heat up, the moisture in interior portions 304 transforms to expanding vapor, a positive pressure builds in interior portions 304, and segments 200 expand and grow in cross-section to become puffed dog treats 400 (FIG. 4) in which air pockets are formed in interior portions 304.

In other words, during first heating step 112, the applied heat transforms the moisture to rapidly expanding vapor. The heat source quickly heats up segments 200 so that the vapor in them expands faster than it can migrate through outer surfaces 202 allowing segments 200 to puff and expand. Outer surfaces 202 of segments 200 act as moisture barriers that tend to retain the expanding vapor in interior portions 304 of segments 200 before the expanding vapor can migrate out of them by evaporation. The expanding vapor produces air pockets or air voids in interior portion 304 of segments 200 and causes them to expand or "puff up." The starch of segments 200 may also contribute to expansion and help to make segments 200 pliable to stretch and expand so that voids or air pockets can be formed. Although interior portions 304 include air pockets, outer surfaces 202 of segments 200 remain substantially free from holes or air pockets caused by expanding vapor. However, surface cracking (similar to cracking that occurs on the outside of a loaf of bread when it is being baked) may occur.

As described above, first heating step 112 hardens outer surfaces 202. Compressive strength tests were performed on two groups of puffed dog treats 400—a first group of 10 puffed dog treats 400 with their outer surfaces 202 removed, and a second group of 10 puffed pet treats 400 with their outer surfaces 202 intact. A sander, small files, and an Etalon dial caliper were used to remove an outside layer of approximately 0.12 cm to approximately 0.15 cm thick from the first group of puffed pet treats 400. A compression test device (e.g., a spring tester operable to apply a force having a magnitude between about 0 kilograms (kgs.) and about 56.7 kgs. available from Rimac Tools, Inc. of Dumont, N.J.) was used to conduct tests to measure the compressive strength of the first and second groups of puffed dog treats 400. During the tests, the average magnitude of force required to cause breakage of the first group of puffed dog treats 400 was about 4.99 kgs. (11 lbs.), and the average magnitude of force required to cause breakage of the second group of puffed dog treats 400 was about 7.94 kgs. (17.5 lbs.), which is about 2.95 kgs. (6.5 lbs.) more than the average of the first group.

Although first heating step 112 causes segments 200 to expand producing puffed dog treats, the drying process also includes a second heating step 114 to bring the moisture content and water activity of segments 200 to a desired level. For example, the moisture content of segments 200 after second heating step 114 may be in the range from about 2% or less by weight to about 8% by weight. Second heating step 114 may be a continuation of first heating step 112 in which the heating device used during first heating step 112 is used for second heating step 114 and the temperature inside heating device is maintained at approximately the same temperature that was used during first heating step 112. Alternatively, the temperature used during second heating step 114 may be different from that used during first heating step 112. For example, the temperature inside the heating device may be adjusted, or segments 200 may be transferred to a second heating device that has a different temperature. The temperature during second heating step 114 may be in a range from about 135° C. to about 149° C. Second heating step 114 lasts approximately 90 minutes. After second heating step 114, segments 200 are cooled (step 116).

Method 100 produces puffed dog treats having a soft crunch; the puffed dog treats are easy for a pet to chew and ingest. For example, method 100 may produce pillow-shaped pet treats with a hardened outer surface and a crunchy interior portion having an air pocket structure. The air pocket structure makes the puffed dog treats less dense than they otherwise would be without the air pocket structure. Moreover, a compressive strength of a puffed dog treat is appreciably less than it would otherwise be absent the air pocket inner core or inner structure. For example, using a compression test device available from Rimac Tools, Inc., tests were conducted to measure the compressive strength of dried puffed dog treats 400 and dried segments 200 that were not puffed. During the tests, the magnitude of force required to cause breakage of puffed dog treats 400 ranged from about 3.0 kgs. (6.6 lbs.) to about 11.3 kgs. (25 lbs.) compared to about 27.2 kgs. (60 lbs.) to about 40.8 kgs. (90 lbs.) for dried non-puffed segments 200. Puffed dog treats 400 have a stable shelf life without having an appreciable amount of sodium-based or chemical preservatives. For example, puffed dog treats 400 may have less than 0.01% by weight of a sodium-based or chemical preservative.

Figure 4:
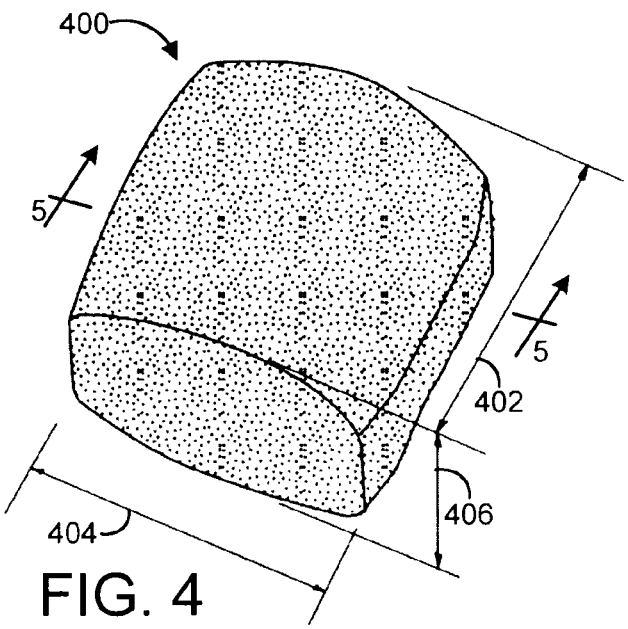
FIG. 4 is an isometric view of the extruded mixture segment of FIG. 2 after it is heated to form a puffed dog treat.
Figure 5:
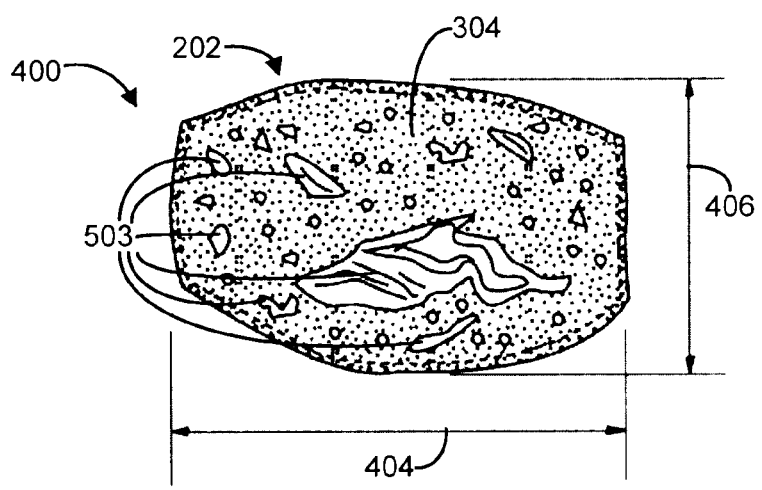
FIG. 5 is a sectional view taken along lines 5-5 of FIG. 4 to show an air pocket and open structure formed inside the puffed dog treat.

FIG. 4 is a three-dimensional view of puffed dog treat 400 after being heated and cooled according to method 100. FIG. 4 shows that treat 400 has a convex or "puffed up" surface profile. FIG. 5 is a cross-sectional view of treat 400 and shows hardened outer surface 202 and multiple internal air pockets 503 formed in interior portion 304 during first heating step 112. A substantial portion of the volume of puffed dog treat 400 may be in the form of air pockets 503. For example, the volume occupied by air pockets 503 may be from about 20% to about 70% of the volume of puffed dog treat 400. After heating, nominal dimensions of treat 400 are a length 402 of about 2.54 cm, a width 404 of about 1.52 cm, and a height (i.e., thickness) 406 of about 1.27 cm (measured at approximately the center of treat 400). Height 406 of treat 400 after steps 112, 114, and 116 is about 1.7 times height 220 of extruded segment 200. The volume occupied by treat 400 is greater than the volume occupied by extruded segment 200. For example, the volume of extruded segment 200 is about 3.18 cm$^3$, and the volume of treat 400 is about 4.9 cm$^3$. In other words, the volume occupied by the air pockets (i.e., the "void volume") of treat 400 is about 1.72 cm$^3$, which is about 54% of the volume of extruded segment 200 and about 35% of the volume of treat 400.

Example Production Run

The following is an example of a production run for making puffed dog treats 400. To make a batch of puffed dog treats 400, the following dry ingredients were mixed in a mixing bowl using a Leland ribbon mixer: 25 kgs. (55.1 lbs.) of dry salmon, 11.3 kgs. (25 lbs.) of PC-10 modified potato starch, 1.3 kgs. (3 lbs.) of sweet potato, 0.9 kg. (2 lbs.) of dried blueberry, 0.9 kg. (2 lbs.) of dried cranberry, 0.01 kg. (0.03 lb.) zinc, and 0.009 kg. (0.20 lb.) Naturox® Plus Dry antioxidant. The dry ingredients were mixed together for 2.5 minutes, the sides of the mixing bowl were scraped, and the dry ingredients were mixed for an additional 2.5 minutes. After mixing, the dry ingredients resembled the dry ingredients of a cookie or cake batter.

The dry ingredients were fed into a Coperion 26 mm twin screw extruder at a rate of 0.45 kg. (16.0 ounces (oz.)) per minute with a screw speed of about 375 revolutions per minute (rpm). Water was added to the dry ingredients at a rate of approximately 0.23 kg. (8.25 oz. by weight) per minute during the extrusion process. The extruder mixed the water and dry ingredients in the heated screw chambers. The heat chambers were set to different temperatures as follows: chamber #1=0° C., chamber #2=15° C., chamber #3=15° C., chamber #4=15° C., chamber #5=90° C., chamber #6=90° C., chamber #7=15° C., chamber #8=15° C., chamber #9=15° C., chamber #10=90° C., chamber #11=90° C., and chamber

12=90° C. The mixing and kneading action of the twin screws and the heat in each of the chambers caused the starch to bind with the other ingredients. The screws of the extruder forced the mixture through an opening in a die plate or nozzle, and the extruded mixture was cut (e.g., sheared) into multiple segments 200 of a desired length.

Segments 200 were baked in an oven available from Enviro-Pak Corporation of Clackamas, Oreg., at a temperature of approximately 148.9° C. for approximately 90 minutes. The temperature of the oven generated vapor inside segments 200 and caused the vapor to expand while remaining trapped inside them thereby causing segments 200 to "puff up." Segments 200 thus attained an expanded appearance with their centers filled with air pockets. Segments 200 were relatively light in density yet firm such that a dog consuming them would experience a soft crunch.

Figure 6:
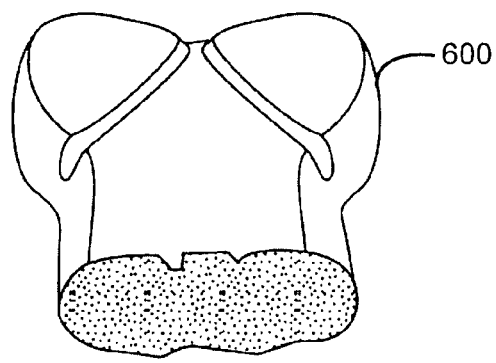
FIG. 6 is a fragmentary isometric view of a Milk-Bone® dog biscuit of a type intended for small dogs weighing less than 20 pounds.
Figure 7:
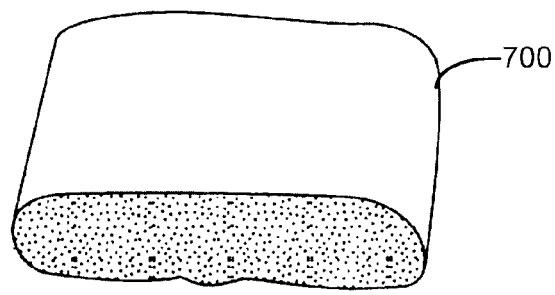
FIG. 7 is a fragmentary isometric view of an Original Alaskan Bear® gourmet dog treat.

Compressive strength testing was performed on puffed dog treats 400 produced during the production run, and comparison compressive strength testing was performed on a Milk-Bone® small dog biscuit 600 (shown in FIG. 6) and an Original Alaskan Bear® treat 700 (shown in FIG. 7). Compressive strength testing was performed on 20 puffed dog treats 400, 20 Milk-Bone® small dog biscuits 600, and 20 Original Alaskan Bear® treats 700 using a spring tester available from Rimac Tools, Inc. that was modified to check the compressive strengths of them. The spring tester was operable to apply a force having a magnitude from about 0 kgs. to about 56.7 kgs. (125 lbs.). The average magnitude of force required to break (e.g., split into pieces) the 20 puffed dog treats 400, 20 Milk-Bone® small dog biscuits 600, and 20 Original Alaskan Bear® treats 700 was as follows:

| | |
|---|---|
| Puffed dog treats 400: | 7.94 kgs. (17.5 lbs.) average |
| Milk-Bone ® small dog biscuits 600: | 42.6 kgs. (94 lbs.) average |
| Original Alaskan Bear ® treats 700: | 15.7 kgs. (34.6 lbs.) average |

Thus, the force required to break puffed dog treats 400 was considerably less than that required to break Milk-Bone® biscuits 600 and Original Alaskan Bear® treats 700, demonstrating that puffed dog treats 400 provide a softer chew for a pet.

Skilled persons will recognize that many variations, enhancements, and modifications of the concepts described herein are possible without departing from the underlying principles of the invention. The scope of the invention should, therefore, be determined only by the following claims and their equivalents.

The invention claimed is:

1. A method of producing puffed animal treats from a mixture having protein, starch, and water, comprising:
   introducing the mixture into an extruder that includes an opening from which the mixture is to be extruded;
   applying a motive force to the mixture to pass it out of the opening of the extruder to form a shaped extrudate;
   cutting the extrudate into multiple segments having cross-sectional areas, each of the multiple segments including a moisture-containing interior portion and a skin-like outer surface substantially enclosing the moisture-containing interior portion, the moisture-containing interior portion of each of the multiple segments characterized by an insubstantial void volume, and the outer surface of each segment of the multiple segments being substantially free from holes;
   air drying the multiple segments to toughen their outer surfaces and reduce their cross-sectional areas; and
   performing post-extrusion heating in first and second heating phases,
   the performing of the first heating phase including heating the multiple segments at a first temperature of greater than or equal to about 100 degree C. for a first duration, of greater than about 3 minutes, the first temperature and the first duration coordinated to harden the outer surfaces of the multiple segments and thereby increase the tensile strengths of their outer surfaces, and to transform a portion of the moisture contained in the moisture-containing interior portions of the multiple segments to expanding vapor to produce interior that causes the multiple segments to become multiple puffed segments having cross-sectional areas and hardened outer surfaces, each of the multiple puffed segments including an air-containing interior portion with air pockets and thereby increase produced by the expanding vapor, the multiple puffed segments having larger cross-sectional areas than the cross-sectional areas of the multiple segments, and the air-containing interior portion of each of the multiple puffed segments characterized by a void volume occupied by the air pockets, and
   the performing of the second heating phase including heating the multiple puffed segments at a second temperature of greater than or equal to about 100 degree C. for a second duration, the second temperature and the second duration coordinated to produce an amount of moisture of less than about 8% by weight in the air-containing interior portions of the multiple puffed segments and thereby provide puffed animal treats with a crunchy structure.

2. The method of claim 1, in which the opening of the extruder is defined by a side wall, and parts of the outer surfaces are formed as a result of shearing action that occurs between the mixture and the side wall as the mixture is forced out of the opening.

3. The method of claim 1, in which a moisture content of the multiple puffed segments after the second heating phase is in a range of about 2% by weight to about 8% by weight.

4. The method of claim 1, in which the multiple segments are shaped as pellets.

5. The method of claim 1, in which cold extrusion processing is used to shape the mixture.

6. The method of claim 5, in which the water is mixed with the protein and starch before the water, protein, and starch are introduced into the extruder.

7. The method of claim 1, in which hot extrusion processing is used to shape the mixture.

8. The method of claim 7, in which water is mixed with the protein and starch after the protein and starch are introduced into the extruder.

9. The method of claim 1, in which the post-extrusion heating is performed during one or both of the first and second heating phases using infrared radiation, microwave radiation, RF radiation, direct hot air, a direct flame, steam, or an electric heat source.

10. The method of claim 1, in which the first and second temperatures are at or above the boiling point of water.

11. The method of claim 1, in which the second temperature is equal to the first temperature.

12. A puffed animal treat produced according to the method of claim 1.

13. The method of claim 1, in which the first duration is substantially less than the second duration.

14. The method of claim 1, in which the first and second temperatures differ by no more than about 15° C.

15. The method of claim 1, in which the protein includes animal protein and the starch includes potato starch.

16. The method of claim 15, in which the animal protein includes salmon.

17. The method of claim 1, in which the mixture further includes a nutritional supplement.

18. The method of claim 17, in which the nutritional supplement includes a fruit.

19. The method of claim 17, in which the nutritional supplement includes an added mineral.

20. The method of claim 17, in which the nutritional supplement includes a probiotic.

21. The method of claim 17, in which the nutritional supplement includes an added amino acid.

22. The method of claim 17, in which the nutritional supplement includes an added vitamin.

23. The method of claim 1, in which each of the puffed animal treats includes less than 0.01% by weight of a sodium-based or chemical preservative.

24. The method of claim 1, in which, for each of the multiple puffed segments, the air pockets occupy from about 20% to about 70% of the air-containing interior portion.

* * * * *